United States Patent
Lemmers, Jr. et al.

(10) Patent No.: US 12,289,030 B2
(45) Date of Patent: Apr. 29, 2025

(54) GENERATOR TERMINAL PASSTHROUGH INSULATOR

(71) Applicant: Hamilton Sundstrand Corporation, Charlotte, NC (US)

(72) Inventors: Glenn C. Lemmers, Jr., Loves Park, IL (US); Mark J. Franklin, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 831 days.

(21) Appl. No.: 17/502,690

(22) Filed: Oct. 15, 2021

(65) Prior Publication Data

US 2022/0123624 A1 Apr. 21, 2022

Related U.S. Application Data

(60) Provisional application No. 63/092,638, filed on Oct. 16, 2020.

(51) Int. Cl.
*H02K 5/22* (2006.01)
*H01R 13/405* (2006.01)
*H02K 15/00* (2006.01)

(52) U.S. Cl.
CPC ........... *H02K 5/225* (2013.01); *H01R 13/405* (2013.01); *H02K 15/0062* (2013.01)

(58) Field of Classification Search
CPC .... H02K 5/225; H02K 15/14; H02K 15/0062; H01R 43/20; H01R 13/405; H01R 13/41; H01R 13/521
See application file for complete search history.

(56) References Cited

U.S. PATENT DOCUMENTS

| | | | |
|---|---|---|---|
| 4,712,029 A | 12/1987 | Nold | |
| 5,752,852 A * | 5/1998 | Onoda | H01R 13/5202 439/559 |
| 6,628,024 B1 | 9/2003 | Mirmobin | |
| 6,897,584 B2 * | 5/2005 | Doherty | H02K 5/225 411/389 |
| 8,648,507 B2 * | 2/2014 | Chamberlin | H02K 5/225 439/813 |

(Continued)

FOREIGN PATENT DOCUMENTS

CN 110311497 A * 10/2019 ............. H02K 15/00
EP 0973242 A1 1/2000

OTHER PUBLICATIONS

CN-110311497-A machine translation Sep. 8, 2024.*

(Continued)

*Primary Examiner* — Leda T Pham
(74) *Attorney, Agent, or Firm* — CANTOR COLBURN LLP

(57) ABSTRACT

A terminal assembly of an electric machine includes an electric machine housing including a terminal opening defined in the electric machine housing. A conductive terminal extends through the terminal opening, from an inside of the electric machine housing to an outside of the electric machine housing. An insulator is located at the terminal. The insulator is positioned between the terminal and a housing wall of the terminal opening. The insulator is sized and configured for installation into the terminal opening after installation of the terminal in the terminal opening.

18 Claims, 4 Drawing Sheets

(56) References Cited

U.S. PATENT DOCUMENTS 9,472,996 B2 * 10/2016 Hochstetler ............ H02K 5/225
2012/0228970 A1 * 9/2012 Patel ..................... H02K 5/225
29/857

OTHER PUBLICATIONS

European Communication pursuant to Article 94(3) EPC corresponding to EP Application No. 21 202 467.3; Issue Date, May 23, 2024.
European Search Report for European Application No. 21202467.3; dated Feb. 23, 2022; 29 pages.

* cited by examiner

GENERATOR TERMINAL PASSTHROUGH INSULATOR

CROSS REFERENCE TO RELATED APPLICATIONS

This application claims the benefit of U.S. Provisional Application No. 63/092,638 filed Oct. 16, 2020, the disclosure of which is incorporated herein by reference in its entirety.

BACKGROUND

Exemplary embodiments pertain to the art of electrical machines.

Generators include a rotor and a stator, in which interaction between the rotating rotor and stationary generator result in the generation of electrical energy at a stator winding. Terminals are brazed to the ends of the stator winding as an output of the electrical energy from the generator to, for example a battery or device to be powered by the generator.

An insulator and sealing O-rings are utilized to insulate the generator housing and other nearby structure from the electrical energy at the stator winding and terminals. In a typical generator, the terminals and insulators are configured such that the insulators and O-rings are installed prior to the terminals being installed and brazed to the stator winding. During brazing, there is a risk of damaging the O-rings due to overheating from the brazing process. Such assembly and installation damage typically requires a costly and time-consuming un-brazing of the terminals from the stator winding to replace the damaged components.

BRIEF DESCRIPTION

In one embodiment, a terminal assembly of an electric machine includes an electric machine housing including a terminal opening defined in the electric machine housing. A conductive terminal extends through the terminal opening, from an inside of the electric machine housing to an outside of the electric machine housing. An insulator is located at the terminal. The insulator is positioned between the terminal and a housing wall of the terminal opening. The insulator is sized and configured for installation into the terminal opening after installation of the terminal in the terminal opening.

Additionally or alternatively, in this or other embodiments the terminal includes a terminal rib abutting an inner rib of the insulator. The terminal rib is configured as a stop for installation of the insulator relative to the terminal.

Additionally or alternatively, in this or other embodiments the electric machine housing includes a housing flange extending into the terminal opening, the housing flange abutting an outer rib of the insulator. The housing flange is configured as a stop for installation of the insulator relative to the electric machine housing.

Additionally or alternatively, in this or other embodiments an inner retaining ring is installed between the terminal and the insulator to retain the insulator to the terminal.

Additionally or alternatively, in this or other embodiments the inner retaining ring is installed in a terminal groove in the terminal.

Additionally or alternatively, in this or other embodiments an outer retaining ring is installed between the housing wall and the insulator to retain the insulator to the electric machine housing.

Additionally or alternatively, in this or other embodiments the outer retaining ring is positioned in a wall groove in the housing wall.

In another embodiment, an electric machine includes a housing, a rotor located in the housing and configured to rotate about a rotor axis, and a stator located in the housing and defining an air gap to the rotor. The stator includes a stator core, and a stator winding located at the stator core. The electric machine further includes a terminal assembly including a conductive terminal electrically connected to the stator winding and extending through a terminal opening in the housing, from an inside of the housing to an outside of the housing. An insulator is located at the terminal. The insulator is positioned between the terminal and a housing wall of the terminal opening. The insulator is sized and configured for installation into the terminal opening after installation of the terminal in the terminal opening.

Additionally or alternatively, in this or other embodiments the terminal includes a terminal rib abutting an inner rib of the insulator. The terminal rib is configured as a stop for installation of the insulator relative to the terminal.

Additionally or alternatively, in this or other embodiments the housing includes a housing flange extending into the terminal opening. The housing flange abuts an outer rib of the insulator. The housing flange is configured as a stop for installation of the insulator relative to the housing.

Additionally or alternatively, in this or other embodiments an inner retaining ring is installed between the terminal and the insulator to retain the insulator to the terminal.

Additionally or alternatively, in this or other embodiments the inner retaining ring is installed in a terminal groove in the terminal.

Additionally or alternatively, in this or other embodiments an outer retaining ring installed between the housing wall and the insulator to retain the insulator to the housing.

Additionally or alternatively, in this or other embodiments the outer retaining ring is located in a wall groove in the housing wall.

Additionally or alternatively, in this or other embodiments the electric machine is a generator.

Additionally or alternatively, in this or other embodiments the terminal is connected to the stator winding via brazing.

In yet another embodiment, a method of assembly of an electric machine includes installing a terminal in a terminal opening of an electric machine housing, and inserting an insulator into the terminal opening between the terminal and a housing wall of the terminal opening after installation of the terminal in the terminal opening.

Additionally or alternatively, in this or other embodiments the terminal is secured to a stator winding of the electric machine prior to inserting the insulator into the terminal opening.

Additionally or alternatively, in this or other embodiments an inner retaining ring is installed between the terminal and the insulator to retain the insulator to the terminal.

Additionally or alternatively, in this or other embodiments an outer retaining ring is installed between the housing wall and the insulator to retain the insulator to the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
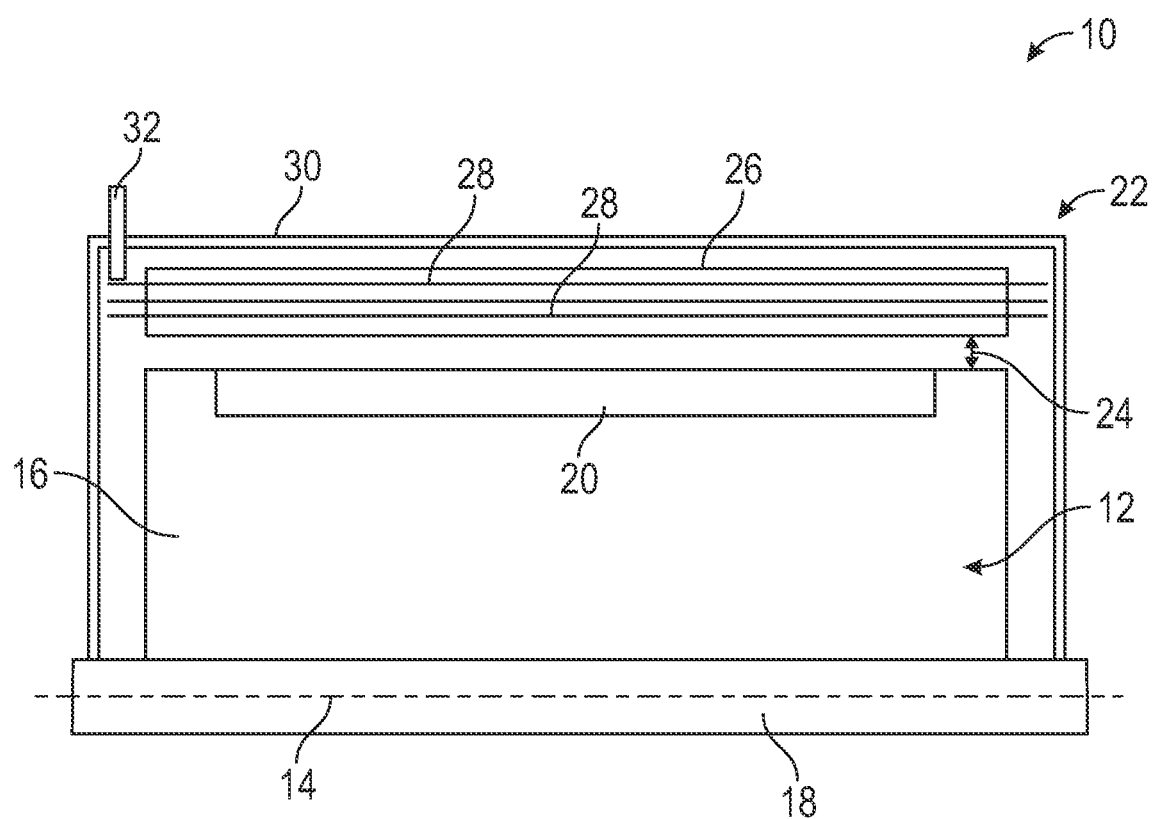
FIG. 1 is a partial cross-sectional view of an embodiment of an electric machine.

Referring now to FIG. 1, illustrated is a schematic view of an embodiment of an electric machine 10. The electric machine 10 includes a rotor assembly 12 configured to rotate about a machine central axis 14. In some embodiments, the rotor assembly 12 includes a rotor body 16, and a rotor shaft 18 located at the machine central axis 14. In some embodiments, the electric machine 10 is a permanent magnet electric machine with a plurality of permanent magnets 20 located at the rotor body 16. A stator 22 is located radially outboard of the rotor assembly 12 defining a radial air gap 24 between the stator 22 and the rotor assembly 12. The stator 22 includes a stator core 26 and a plurality of stator windings 28 extending through the stator core 26 which are magnetically interactive with the rotor assembly 12. The rotor assembly 12 and stator 22 are located inside of a housing 30 which seals the electric machine 10 from the outside environment.

In some embodiments, the electric machine 10 is configured as a generator, in which rotational energy is input into the rotor assembly 12, which energizes the stator windings 28 via electromagnetic interaction between the rotor assembly 12 and the stator windings 28 across the air gap 24. The electrical energy generated at the stator windings 28 is output from the electric machine 10 via one or more terminals 32 connected to the stator windings 28 and extending through the housing 30.

In other embodiments, the electric machine 10 is configured as a motor in which electrical energy is input into the stator windings 28 of the electric machine 10 via the terminals 32. The energized stator windings 28 interact with the rotor assembly 12 and drive rotation of the rotor assembly 12 about the machine central axis 14.

Figure 2:
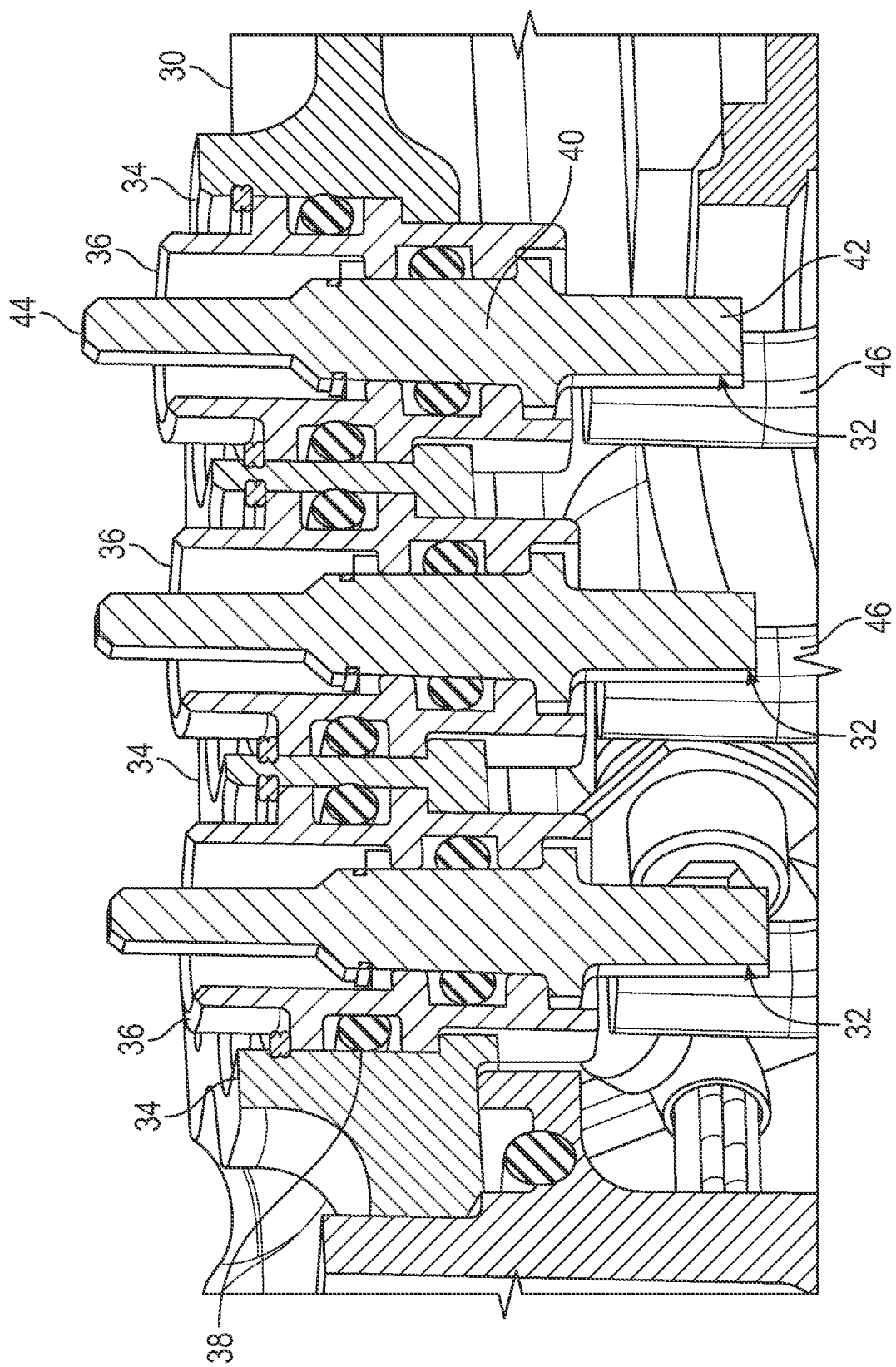
FIG. 2 is a partial cross-sectional view of an embodiment of a terminal assembly.

Referring now to FIG. 2, illustrated is a partial cross-sectional view of the electric machine 10. Each terminal 32 extends through a respective terminal opening 34 in the housing 30. An insulator 36 is located in the terminal opening 34 between the terminal 32 and a wall 38 of the housing 30 to electrically isolate the terminal 32 from the housing 30. The insulator 36 extends circumferentially around the terminal 32. The terminal 32 includes a terminal body 40 extending from a terminal base 42 at a first end of the terminal 32 located inside the housing 30 to a terminal tip 44 located outside the housing 30 at an opposite second end of the terminal 32. The terminal base 42 is connected to a conductor 46 of the stator winding 28 by, for example, brazing.

Figure 3:
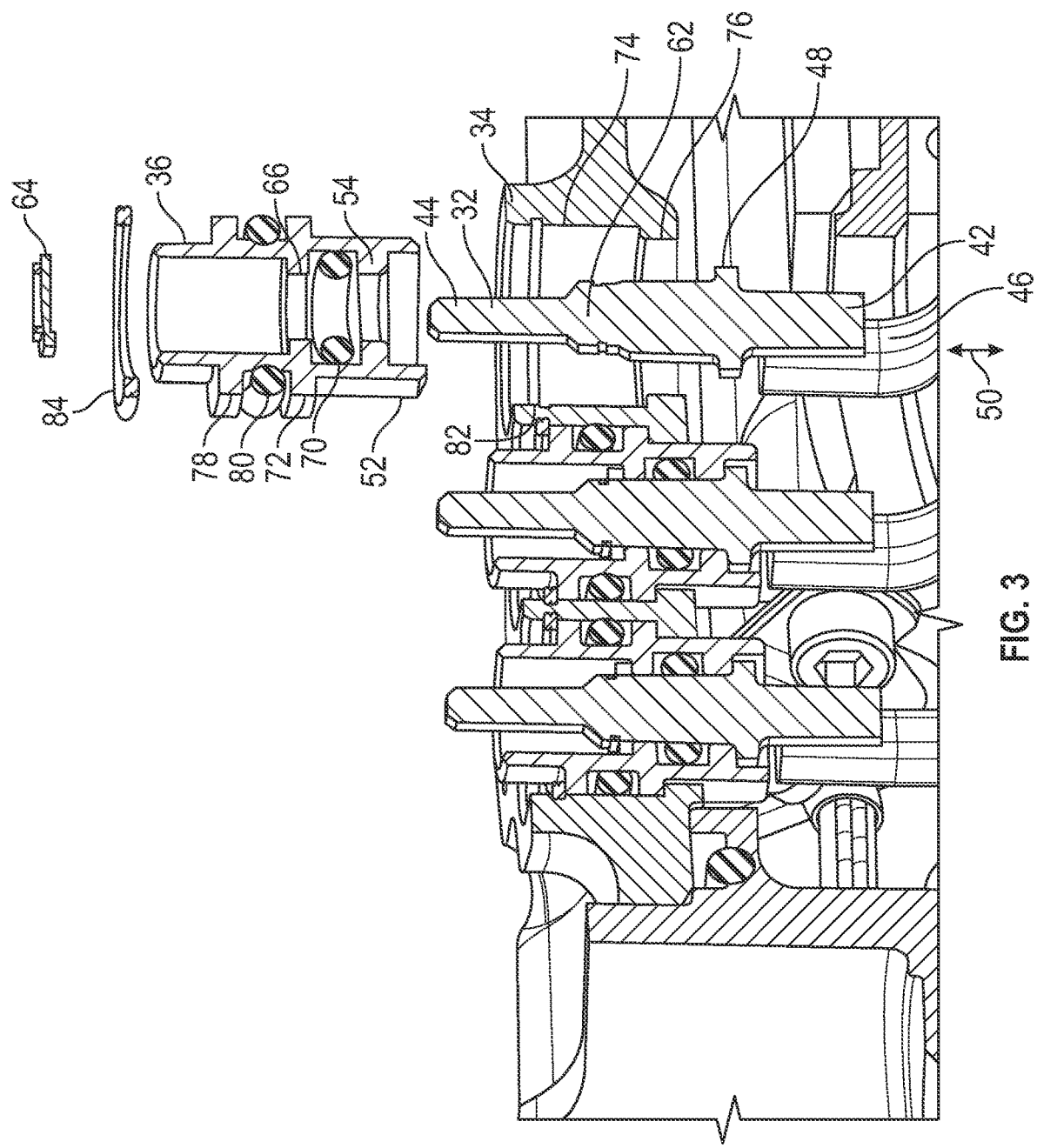
FIG. 3 is a partially exploded cross-sectional view of an embodiment of a terminal assembly.

Referring now to FIG. 3, the terminal 32, the insulator 36 and the terminal opening 34 are sized and configured to allow for installation of the insulator 36 to the terminal opening 34 after installation of the terminal 32 into the terminal opening 34 and after brazing of the terminal 32 to the conductor 46. The terminal 32 includes a terminal rib 48 located along a terminal axial direction 50 between the terminal base 42 and the terminal tip 44, and extending outwardly from the terminal body 40. The terminal rib 48 is utilized to locate the insulator 36 relative to the terminal 32. As shown in FIG. 3, the insulator 36 includes an insulator body 52, and a complimentary insulator first inner rib 54 extends from the insulator body 52. The insulator first inner rib 54 is configured such that, when the insulator 36 is installed, abuts the terminal rib 48 to locate the insulator 36 relative to the terminal 32. To locate that insulator 36 relative to the terminal 32, the terminal rib 48 has a terminal rib outer diameter that is greater than an insulator first inner rib diameter, and the insulator first inner rib diameter is greater than a terminal body diameter.

Further, the terminal 32 includes a terminal groove 62 into which an inner retaining ring 64 is installed. The terminal groove 62 is located along the terminal axial direction 50 between the terminal rib 48 and the terminal tip 44. The inner retaining ring 64 abuts an insulator second inner rib 66 and thereby retains the insulator 36 relative to the terminal 32. A second inner rib diameter is greater than the terminal body diameter. In some embodiments, an inner O-ring 70 is positioned between the terminal 32 and the insulator 36 at, for example, between the insulator first inner rib 54 and the insulator second inner rib 66 to seal between the terminal 32 and the insulator 36.

The insulator 36 is also located and retained to the housing 30 at the terminal opening 34. A first insulator outer rib 72 extends from the insulator body 52 toward a terminal opening wall 74. The housing 30 includes a housing flange 76 extending toward the terminal axial direction 50 from the terminal opening wall 74. The housing flange 76 abuts the first insulator outer rib 72 when the insulator 36 is installed in the terminal opening 34 to act as a stop for installation of the insulator 36 into the terminal opening 34. The insulator 36 further includes a second insulator outer rib 78 extending from the insulator body 52. In some embodiments, an outer O-ring 80 is located between the terminal opening wall 74 and the insulator body 52 at, for example, between the first insulator outer rib 72 and the second insulator outer rib 78.

Further, the terminal opening wall 74 includes a wall groove 82 into which an outer retaining ring 84 is installed. The outer retaining ring 84 abuts the insulator second outer rib 78 and thereby retains the insulator 36 relative to the terminal opening 34.

Figure 4:
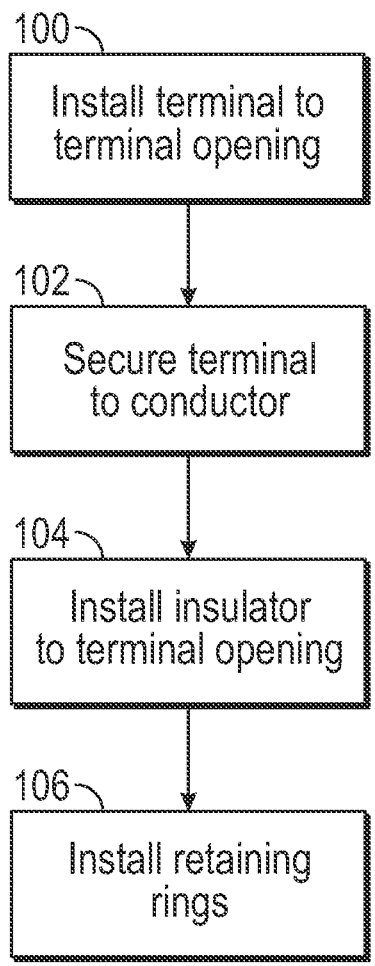
FIG. 4 is a schematic illustration of a method of assembling an electric machine.

Referring now to FIG. 4, a method of assembly of an electric machine 10 is illustrated. At step 100, the terminal 32 is installed in the terminal opening 34. Then, at step 102, the terminal 32 is secured to the conductor 46 by, for example, brazing. Once the terminal 32 is secured to the conductor 46, the insulator 36 is inserted into the terminal opening 34 at step 104. In some embodiments, the outer O-ring 80 and the inner O-ring 70 are installed to the insulator 36 before insertion of the insulator into the terminal opening 34. After insertion of the insulator 36 into the terminal opening 34, the outer retaining ring 84 and the inner retaining ring 64 into the wall groove 82 and the terminal groove 62, respectively, at step 106 to retain the insulator 36 relative to the housing 30 and the terminal 32.

The term "about" is intended to include the degree of error associated with measurement of the particular quantity based upon the equipment available at the time of filing the application.

The embodiments disclosed herein allow for installation of the insulator 36 after installation and brazing of the terminal 32. This reduces the risk of damage to the insulator 36 during assembly of the electric motor 10. Further, any insulators 36 in need of replacement may be removed and replaced without unbrazing the terminal 32 from the conductor 44.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A terminal assembly of an electric machine, comprising:
    an electric machine housing including a terminal opening defined in the electric machine housing;
    a conductive terminal extending through the terminal opening, from an inside of the electric machine housing to an outside of the electric machine housing; and
    an insulator located at the terminal, the insulator disposed between the terminal and a housing wall of the terminal opening;
    wherein the insulator is sized and configured for installation into the terminal opening after installation of the terminal in the terminal opening;
    wherein the terminal includes a terminal rib formed as a protrusion extending radially outwardly from a terminal body, the terminal rib abutting an inner rib of the insulator, the terminal rib configured as a stop for installation of the insulator relative to the terminal.

2. The terminal assembly of claim 1, wherein the electric machine housing includes a housing flange extending into the terminal opening, the housing flange abutting an outer rib of the insulator, the housing flange configured as a stop for installation of the insulator relative to the electric machine housing.

3. The terminal assembly of claim 1, further comprising an inner retaining ring installed between the terminal and the insulator to retain the insulator to the terminal.

4. The terminal assembly of claim 3, wherein the inner retaining ring is installed in a terminal groove in the terminal.

5. The terminal assembly of claim 1, further comprising an outer retaining ring installed between the housing wall and the insulator to retain the insulator to the electric machine housing.

6. The terminal assembly of claim 5, wherein the outer retaining ring is disposed in a wall groove in the housing wall.

7. An electric machine, comprising:
    a housing;
    a rotor disposed in the housing and configured to rotate about a rotor axis;
    a stator disposed in the housing, the stator defining an air gap to the rotor and including:
        a stator core; and
        a stator winding disposed at the stator core; and
    a terminal assembly including:
        a conductive terminal electrically connected to the stator winding and extending through a terminal opening in the housing, from an inside of the housing to an outside of the housing; and
        an insulator located at the terminal, the insulator disposed between the terminal and a housing wall of the terminal opening;
        wherein the insulator is sized and configured for installation into the terminal opening after installation of the terminal in the terminal opening;
        wherein the terminal includes a terminal rib formed as a protrusion extending radially outwardly from a terminal body, the terminal rib abutting an inner rib of the insulator, the terminal rib configured as a stop for installation of the insulator relative to the terminal.

8. The electric machine of claim 7, wherein the housing includes a housing flange extending into the terminal opening, the housing flange abutting an outer rib of the insulator, the housing flange configured as a stop for installation of the insulator relative to the housing.

9. The electric machine of claim 7, further comprising an inner retaining ring installed between the terminal and the insulator to retain the insulator to the terminal.

10. The electric machine of claim 9, wherein the inner retaining ring is installed in a terminal groove in the terminal.

11. The electric machine of claim 7, further comprising an outer retaining ring installed between the housing wall and the insulator to retain the insulator to the housing.

12. The electric machine of claim 11, wherein the outer retaining ring is disposed in a wall groove in the housing wall.

13. The electric machine of claim 7, wherein the electric machine is a generator.

14. The electric machine of claim 7, wherein the terminal is connected to the stator winding via brazing.

15. A method of assembly of an electric machine, comprising:
    installing a terminal in a terminal opening of an electric machine housing; and
    inserting an insulator into the terminal opening between the terminal and a housing wall of the terminal opening after installation of the terminal in the terminal opening;
    wherein the terminal includes a terminal rib extending radially outwardly from a terminal body, the terminal rib abutting an inner rib of the insulator, the terminal rib configured as a stop for installation of the insulator relative to the terminal.

16. The method of claim 15, further comprising securing the terminal to a stator winding of the electric machine prior to inserting the insulator into the terminal opening.

17. The method of claim 15, further comprising installing an inner retaining ring between the terminal and the insulator to retain the insulator to the terminal.

18. The method of claim 15, further comprising installing an outer retaining ring between the housing wall and the insulator to retain the insulator to the housing.

\* \* \* \* \*